United States Patent [19]

Rüdel

[11] Patent Number: 5,034,102
[45] Date of Patent: Jul. 23, 1991

[54] COLUMN FOR DISTILLATION OF CHARGE PRODUCTS HAVING A TENDENCY FOR TWO-PHASE FORMATION IN SUMP

[75] Inventor: Ulrich Rüdel, Oberhausen, Fed. Rep. of Germany

[73] Assignee: Krupp Koppers GmbH, Essen, Fed. Rep. of Germany

[21] Appl. No.: 411,101

[22] Filed: Sep. 22, 1989

[30] Foreign Application Priority Data

Sep. 27, 1988 [DE] Fed. Rep. of Germany ....... 3832724

[51] Int. Cl.$^5$ .............................................. B01D 3/32
[52] U.S. Cl. .................................... 202/153; 202/181; 203/1; 203/39; 203/98; 203/DIG. 19; 137/172
[58] Field of Search ............... 202/153, 158, 159, 154, 202/155, 156, 181; 196/100, 130, 139; 208/349, 358; 203/1, 39, DIG. 19, 99, DIG. 25, 98, 94; 137/172

[56] References Cited

U.S. PATENT DOCUMENTS

| | | | |
|---|---|---|---|
| 2,085,422 | 6/1937 | Fast | 208/358 |
| 2,121,324 | 6/1938 | Manley | 137/172 |
| 2,134,882 | 11/1938 | Monro | 196/100 |
| 2,310,298 | 2/1943 | Kuhl et al. | 137/172 |
| 2,398,213 | 4/1946 | Dutson et al. | 196/100 |
| 2,411,809 | 11/1946 | Rupp et al. | 202/153 |
| 2,509,136 | 5/1950 | Cornell | 202/154 |
| 2,534,173 | 12/1950 | Kraft | 202/181 |
| 2,795,536 | 6/1957 | Grossberg et al. | 202/153 |
| 2,974,100 | 3/1961 | Mitchell | 196/139 |
| 3,128,784 | 4/1964 | Parks | 137/172 |
| 3,425,935 | 2/1969 | Cahn | 208/358 |
| 3,819,511 | 6/1974 | Peiser et al. | 208/358 |
| 4,166,773 | 9/1979 | Higley et al. | 202/153 |
| 4,601,788 | 7/1986 | Bannon | 202/153 |
| 4,618,051 | 10/1986 | Skraba | 196/139 |
| 4,630,628 | 12/1986 | Hepworth | 137/172 |

FOREIGN PATENT DOCUMENTS 269809 4/1969 Austria ...................... 203/DIG. 25

*Primary Examiner*—Wilbur Bascomb
*Attorney, Agent, or Firm*—Michael J. Striker

[57] ABSTRACT

The column for distillation of charge products which form a heavier liquid phase and a lighter liquid phase and connected sump circulating boiler are provided with a liquid impermeable collecting bottom plate located in a lower part of the column. The bottom plate has a discharge passage and the column is provided with a liquid withdrawal outlet arranged closely underneath the collecting bottom plate but above the lower end of the discharge passage so that the heavier phase can be prevented from reaching the liquid withdrawal outlet by gravity. One pipe connects the sump circulating boiler with the liquid withdrawal outlet to provide a free flow of liquid from the column to the sump circulating boiler for heating and another pipe connects the column with the sump circulating boiler above the collecting bottom plate so that the reheated liquid can flow from the sump circulating boiler to the column without a circulating pump. The column also has a column sump arranged so that the lower part of the column opens into the column sump, which has a cross-section which is smaller than the cross-section of the remaining portion of the column; and a separating layer regulator for regulating a separating layer between the lighter and the heavier phase of the charge product and connected with the column sump having the smaller cross-section for greater sensitivity and reliability.

2 Claims, 1 Drawing Sheet

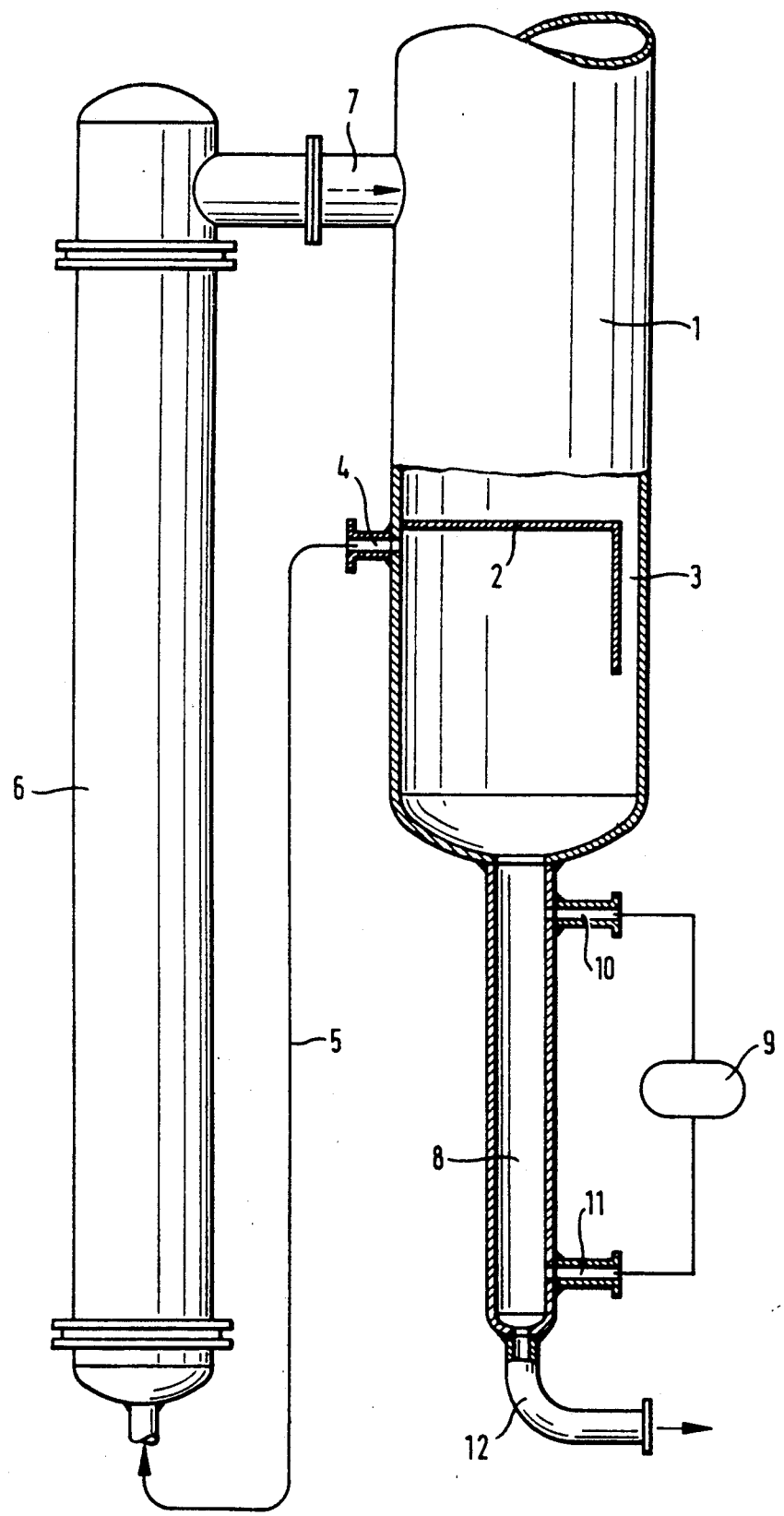

COLUMN FOR DISTILLATION OF CHARGE PRODUCTS HAVING A TENDENCY FOR TWO-PHASE FORMATION IN SUMP

BACKGROUND OF THE INVENTION

The present invention relates to a column for distillation of charge products which have a tendency to form two-phases in a sump of the column.

Particularly, it relates to such a column for distillation of charge products having the above tendency, which is heated by a sump circulating boiler.

Columns of the above-mentioned general type are known in the art. During operation of such columns which are heated by a sump circulating boiler, as a rule difficulties occur when the charge product to be distilled has tendency to two-phase formation in the sump of the column. The heavy phase produced in this case can bring to stoppage the circulation of liquid between the column sump and the boiler required for the column heating, or at least considerably affect the same.

For eliminating these difficulties it has been proposed to provide a forced circulation between the column sump and a separate separating container by means of a pump. Thereby the heavy phase in the separating container is separated by gravity force separation, and only a light phase is pumped back into the column sump. The separating layer between the light and heavy phases is maintained constant by a separating layer regulator. This method is not free of disadvantages, since the installation of a pump for the forced circulation as well as a separate separating container cause additional installation and operational costs. Moreover, the use of the pump leads to the fact that the liquid is mixed by the pump before the entrance in the separator. The heavy phase is therefore produced only in the form of very small droplets, which naturally affect its subsequent separation.

SUMMARY OF THE INVENTION

Accordingly, it is an object of the present invention to provide a column of the above mentioned general type which avoids the disadvantages of the prior art.

More particularly, it is an object of the present invention to provide a column, particularly for distillation of charge products which have a tendency to two-phase formation in a sump which eliminates the above-mentioned disadvantages.

In keeping with these objects and with others which will become apparent hereinafter, one feature of the present invention resides, briefly stated, in a column of the abovementioned type in which a lower part of the column accommodates a liquid-impermeable collecting bottom plate with a discharge passage, a liquid withdrawal outlet through a sump circulating boiler located closely underneath the collecting bottom plate, and the lower part of the column opens into a column sump with a cross section smaller than a cross section of the column itself.

When the column is designed in accordance with the present invention, it avoids the disadvantages of the prior art.

The drawings show in a simplified form a column with an associated sump circulating boiler. The upper part of the column is not shown in the drawing since it has a conventional shape.

In accordance with another feature of the invention the discharge passage has such a length that a distance between its lower end and the liquid withdrawal is sufficient for a separation of a heavy phase of the charge product.

A further feature of the present invention is that the apparatus is designed so that the column sump has a smaller cross section, when the proportion of heavier phase in the charge product is expected to be smaller.

It is also another feature of the invention that the column is provided with a separating layer regulator.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE of the drawing is a schematic view showing a distillation column in accordance with the present invention with an associated sump circulating boiler.

DESCRIPTION OF A PREFERRED EMBODIMENT

A distillation column is identified in the drawings with reference numeral 1. A liquid-impermeable collecting bottom plate 2 is located in a lower part of the column 1. The collecting bottom plate 2 is angled at its right side so that between the wall of the column and the bent part of the collecting bottom plate 2 a discharge passage 3 is formed.

A liquid withdrawal outlet 4 is located closely underneath the collecting bottom plate 2. A partial quantity of the liquid located in the column sump is withdrawn through the liquid withdrawal outlet 4 via a conduit 5 to a sump circulating boiler 6. While in the previously known constructions this liquid withdrawal is provided at the lower end of the column, according to the present invention it is arranged above. Thereby the heavy phase cannot be supplied to the sump circulating boiler 6. For the operation of the boiler, this relocation of the liquid withdrawal does not have any negative effect since the static liquid columns remain unchanged.

It is to be understood that the sump circulating boiler 6 is provided with required devices for heating and for circulating the liquid, which are however not shown in the drawings. The reheated liquid flows through a pipe 7 located above the collecting bottom plate 2, back into the column 1. The liquid flowing down from above is collected on the collecting bottom plate 2 and withdrawn through the discharge passage 3 into the column sump.

The length of the discharge passage 3 is dimensioned so that the distance between its lower end and the liquid withdrawal outlet 4 is so great that on the way of the liquid from the lower end of the discharge passage 3 to the liquid withdrawal outlet 4 the droplets of the heavy phase sink downwardly and cannot be transported back into the liquid withdrawal outlet 4. The falling or sinking droplets of the heavy phase are collected in the narrowing column sump 8.

The comparatively narrow column sump 8 serves for insuring an efficient regulating ability for separating layer regulator 9 installed in this area. Regulator 9 is connected through connections 10 and 11 with the narrow column sump 8. So that the regulation in principle functions effectively the narrowing of the column sump 8 relative to the remaining column 1 has to be increased with the reduction of the portion of the heavy phase in the liquid. For example the diameter of the column sump 8 can amount to only one-fifth of the diameter of the remaining column 1. The heavy phase collected in the lower part of the narrow column sump 8 can be withdrawn through a conduit 12 outwardly of the column.

With the column designed in accordance with the present invention, the heavy phase is separated inside the column 1 so that a separate separating container is no longer required. The disadvantages which occur in such a separating container and as are described hereinabove no longer occur in the inventive construction. When the column in accordance with the inventive construction is utilized, pumps for forced circulation through the separating container can be dispensed with, pumps which are formed as sump product pumps can be dimensioned much smaller, and as a result, the inventive construction leads to considerable economy in installation and operational costs.

It will be understood that each of the elements described above, or two or more together, may also find a useful application in other types of constructions differing from the types described above.

While the invention has been illustrated and described as embodied in a column for distillation of charge products, heated with a sump circulation boiler, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A column for distillation of charge products which have a tendency to form two-phases in a sump, said two phases including a heavier phase and a lighter phase, the column comprising an upper part and a lower part and having a liquid impermeable collecting bottom plate located in said lower part of said column, said bottom plate being provided with a discharge passage having a lower end through which said lighter phase and said heavier phase can flow, and the column being provided with a liquid withdrawal outlet arranged closely underneath said collecting bottom plate but above the lower end of the discharge passage, and also with a sump circulating boiler, means for connecting said liquid withdrawal outlet with said sump circulating boiler to provide a free flow of a partial quantity of a liquid from the column to the sump circulating boiler for heating in the boiler to form a reheated liquid and at least one pipe connecting the column with the sump circulating boiler, said pipe being located above the collecting bottom plate, so that the reheated liquid can flow from the sump circulating boiler to the column; the column also having a column sump arranged so that said lower part of said column opens into said column sump, said column sump having a cross-section which is smaller than the cross-section of a remaining portion of said column not including said column sump; and a separating layer regulator for regulating a separating layer between the lighter and the heavier phase of the charge product and connected with said column sump having the smaller cross-section.

2. A column as defined in claim 1, wherein said discharge passage is substantially vertical and has a length such that a distance between the lower end of the discharge passage and the liquid withdrawal outlet is large enough so that, after passing through said discharge passage, substantially none of said heavier phase reaches said liquid withdrawal outlet.

* * * * *